United States Patent [19]
Chung et al.

[11] Patent Number: 5,969,523
[45] Date of Patent: Oct. 19, 1999

[54] PREAMPLIFIER BIAS MODE TO RE-INITIALIZE A GMR HEAD AFTER LOSING INITIALIZATION

[75] Inventors: Paul Wingshing Chung; John Thomas Contreras; Klaas Berend Klaassen; Calvin Shizuo Nomura, all of San Jose, Calif.

[73] Assignee: International Business Machines Corporation, Armonk, N.Y.

[21] Appl. No.: 08/970,573

[22] Filed: Nov. 14, 1997

[51] Int. Cl.[6] .............................. G11B 5/39; G11B 5/03; G01R 33/02
[52] U.S. Cl. .............................. 324/252; 360/113; 360/66
[58] Field of Search .............................. 324/252; 360/113, 360/66; 338/32 R

[56] References Cited

U.S. PATENT DOCUMENTS

| 5,159,513 | 10/1992 | Dieny et al. | 324/252 |
| 5,206,590 | 4/1993 | Dieny et al. | 324/252 |
| 5,650,887 | 7/1997 | Dovek et al. | 360/113 |

*Primary Examiner*—Jay Patidar
*Attorney, Agent, or Firm*—Merchant & Gould P.C.

[57] ABSTRACT

A method and apparatus for re-initializing a GMR head after losing initialization is disclosed. The invention may use a voltage controlled waveform, which allows the current to vary with the resistance of the GMR head. Furthermore, according to a further aspect of the invention a stack of GMR heads may be reinitialized having the same orientation to preclude inversion of the reset magnetic fields on half of the heads. In addition, improvements in re-initializing GMR heads is provided by implementing wave shaping. The invention can also provide re-initialization of GMR heads at different points in the manufacturing process.

17 Claims, 14 Drawing Sheets

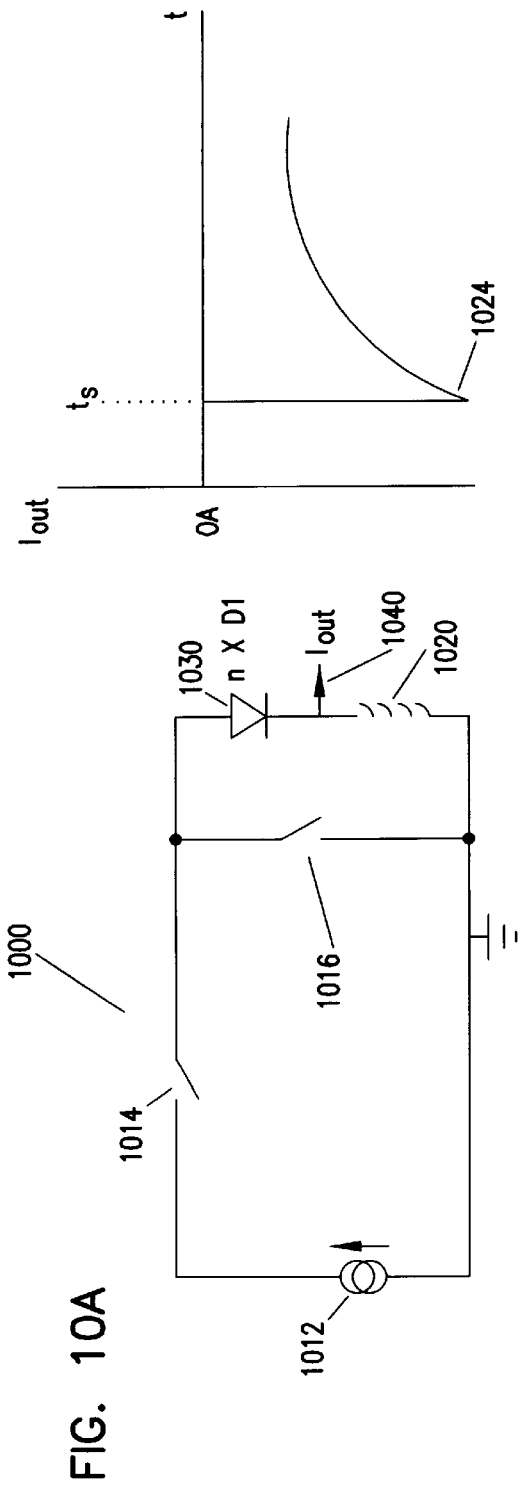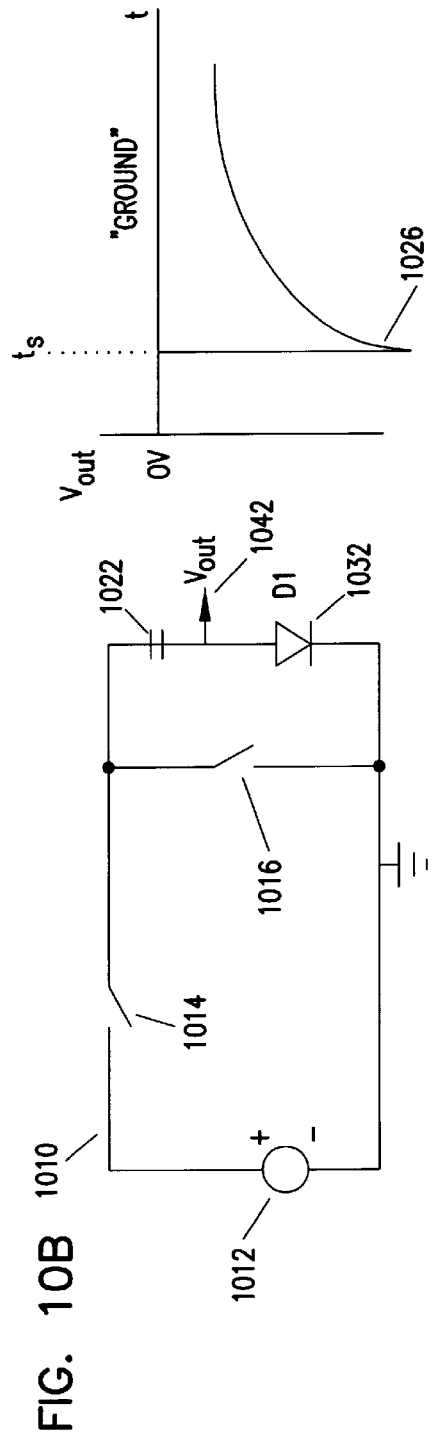
FIG. 10A
FIG. 10B

PREAMPLIFIER BIAS MODE TO RE-INITIALIZE A GMR HEAD AFTER LOSING INITIALIZATION

BACKGROUND OF THE INVENTION

1. Field of the Invention

This invention relates in general to sensors for reading magnetic flux transitions from magnetic media such as disks and tapes, and more particularly to a method and apparatus for re-initialization of a GMR head after losing initialization.

2. Description of Related Art

An MR sensor detects magnetic field signals through the resistance changes of a magnetoresistive element, fabricated from a magnetic material, as a function of the strength and direction of magnetic flux being sensed by the element. The conventional MR sensor operates on the basis of the anisotropic magnetoresistive (AMR) effect in which a component of the element resistance varies as the square of the cosine of the angle between the magnetization in the element and the direction of sense or bias current flow through the element.

MR sensors have application in magnetic recording systems because recorded data can be read from a magnetic medium when the external magnetic field from the recorded magnetic medium (the signal field) causes a change in the direction of magnetization in the MR read head. This in turn causes a change in electrical resistance in the MR read head and a corresponding change in the sensed current or voltage.

A different and more pronounced magnetoresistance, called giant magnetoresistance (GMR), has been observed in a variety of magnetic multilayered structures. The essential feature of a GMR sensor is that is contains at least two ferromagnetic metal layers that are separated by a nonferromagnetic metal layer. This GMR effect has been found in a variety of systems, such as Fe/Cr or Co/Cu multilayers exhibiting strong antiferromagnetic coupling of the ferromagnetic layers, as well as in essentially uncoupled layered structures in which the magnetization orientation in one of the two ferromagnetic layers is fixed or pinned. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus a change in the electrical resistance of the structure. The resistance of the structure changes as the relative alignment of the magnetizations of the ferromagnetic layers changes.

A particularly useful application of the GMR effect is a sandwich structure comprising two only weakly coupled ferromagnetic layers separated by a nonmagnetic metallic spacer layer in which the magnetization of one of the ferromagnetic layers is pinned. The pinning may be achieved by depositing the ferromagnetic layer to be pinned onto an antiferromagnetic layer, such as an iron-manganese (Fe—Mn) layer, to create an interfacial exchange coupling between the two layers. The spin structure of the antiferromagnetic layer can be aligned along a desired direction (in the plane of the layer) by heating beyond the blocking temperature of the antiferromagnetic layer and cooling in the presence of a magnetic field with a predetermined direction.

The blocking temperature is the temperature at which exchange anisotropy vanishes because the local anisotropy of the antiferromagnetic layer, which decreases with temperature, has become too small to anchor the antiferromagnetic spins to the crystallographic lattice. The unpinned or free ferromagnetic layer may also have the magnetization of its extensions (those portions of the free layer on either side of the central active sensing region) fixed, but in a direction perpendicular to the magnetization of the pinned layer so that only the magnetization of the central region of the free-layer can rotate in the presence of an external field. The magnetization in the free-layer extensions may be fixed by longitudinal hard biasing or exchange coupling to an antiferromagnetic layer. However, if exchange coupling is used, the antiferromagnetic material is different from the antiferromagnetic material used to pin the pinned layer, and is typically nickel-manganese (Ni—Mn). This resulting structure is called a spin valve (SV) MR sensor. However, for clarity, the term GMR sensor will be used herein to denote both spin valve as well as GMR sensors.

In a GMR sensor only the free ferromagnetic layer is able to rotate in the presence of an external magnetic field. U.S. Pat. No. 5,159,513, assigned to IBM, discloses a GMR sensor in which at least one of the ferromagnetic layers is of cobalt or a cobalt alloy, and in which the magnetizations of the two ferromagnetic layers are maintained substantially perpendicular to each when an externally applied magnetic field is not present by exchange coupling of the pinned ferromagnetic layer to an antiferromagnetic layer.

U.S. Pat. No. 5,206,590, also assigned to IBM, discloses a basic GMR sensor wherein the free layer is a continuous film having a central active region and end regions. The end regions of the free layer are exchange biased by exchange coupling to one type of antiferromagnetic material, and the pinned layer is pinned by exchange coupling to a different type of antiferromagnetic material.

GMR sensors are a replacement for conventional MR sensors based on the AMR effect. They have special potential for use as external magnetic field sensors, such as in anti-lock braking systems, and as read heads in magnetic recording systems, such as in rigid disk drives. However, the GMR sensor, which is typically fabricated by depositing an antiferromagnetic layer of Fe—Mn onto the ferromagnetic pinned layer of cobalt (Co) or permalloy (Ni—Fe), suffers from the problem that the range of blocking temperature for this interface is relatively low, i.e., it extends only from approximately 130° C. to approximately 160° C. These temperatures can be reached by certain thermal effects during operation of the disk drive, such as an increase in the ambient temperature inside the drive, heating of the GMR sensor due to the bias current, and rapid heating of the GMR sensor due to the head carrier contacting asperities on the disk. In addition, during assembly of the disk drive the GMR sensor can be heated by an electrical current resulting from an electrostatic discharge often referred to as electrical overstress.

If any of these thermal effects cause the GMR sensor to exceed the antiferromagnet's blocking temperature the magnetization of the pinned layer will no longer be pinned in the desired direction. This will lead to a change in the GMR sensor's response to an externally applied magnetic field, and thus to errors, in data read back from the disk.

Nevertheless, the height of MR and GMR sensors used in magnetic recording is determined by mechanical lapping. This mechanical machining process results in wide tolerances in the sensor height. Typically a sensor of 1.5 µm average height may vary from sensor to sensor from 0.7 µm to approximately 2.3 µm. The sensor resistance therefore also shows a wide tolerance from sensor to sensor. If such a sensor were reset by means of a current pulse, the dissipation $I^2R$ would be the highest in the highest resistance sensor, i.e., the sensor with the lowest sensor height. The temperature rise in the latter sensor would also be the highest.

If, instead the sensors are reset by a voltage pulse, the resulting current density is the same in all sensors independent of their height. The temperature rise of the sensor due to the pulse can be calculated to be proportional to the square of the current density. Therefore, all sensors, reset with a voltage pulse, would experience the same temperature increase regardless of their sensor height.

It can be seen that there is a need for re-initializing a GMR head after losing initialization by using a voltage waveform rather than a current pulse.

It can also be seen that there is a need for a method for re-initializing a stack of GMR heads so that the GMR heads all have the same orientation thereby precluding the inversion of half of the GMR heads facing oppositely from the rest.

It can also be seen that there is a need for an apparatus that can provide re-initialization of GMR heads at different points in the manufacturing process.

SUMMARY OF THE INVENTION

To overcome the limitations in the prior art described above, and to overcome other limitations that will become apparent upon reading and understanding the present specification, the present invention discloses a method and apparatus for re-initialization of a GMR head or sensor after losing initialization.

The present invention solves the above-described problems by providing a method and apparatus for re-initializing a GMR head after losing initialization by using a voltage waveform, which allows the current to vary with the resistance of the GMR head. Furthermore, according to a further aspect of the invention a stack of GMR heads may be reinitialized having the same magnetic orientation. In addition, improvements in re-initializing GMR heads is provided by implementing wave shaping of the voltage waveform. Finally, an apparatus according to the present invention can provide re-initialization of GMR heads at different points in the manufacturing process or on the recording device itself.

A method in accordance with the principles of the present invention includes applying an electrical voltage waveform across the GMR sensor in a first direction, said voltage waveform ending at a first time, the voltage waveform having a first amplitude for raising the GMR sensor above a blocking temperature and a second amplitude for setting the magnetic orientation of the GMR sensor.

Other embodiments of a system in accordance with the principles of the invention may include alternative or optional additional aspects. One such aspect of the present invention is that the waveform amplitude has a decaying shape.

Another aspect of the present invention is that the waveform has a decay rate slower than the cooling rate of the GMR sensor.

Another aspect of the present invention is that the waveform has a sloped ramped shape.

Another aspect of the present invention is that the waveform has a stepped shape.

Another aspect of the present invention is that the step shape has a first step value equal to the first amplitude for heating the GMR sensor above a blocking temperature and a final orienting step value equal to the second amplitude, the final orienting step value being above a normal bias level.

Still another aspect of the present invention is that the step shape has a first step value equal to the first amplitude for heating the GMR sensor above a blocking temperature and a final orienting step value equal to the second amplitude, the final orienting step value being equal to a normal bias level.

Another aspect of the present invention is that the waveform is a positive voltage waveform, i.e., develops a voltage across the GMR sensor of the same polarity as the normal bias current required for reading with the sensor.

Another aspect of the present invention is that the waveform is a negative voltage waveform, i.e., develops a voltage across the GMR sensor of the opposite polarity as the normal bias current required for reading with the sensor.

Another aspect of the present invention is that the first amplitude of the voltage waveform signal is selected to cause resetting of the magnetic orientation of the GMR sensor only after being directed across the GMR sensor a plurality of times.

Another aspect of the present invention is that the first amplitude of the voltage waveform is determined by sequentially increasing the first amplitude until the GMR sensor evidences no error conditions.

Yet another aspect of the present invention is that a method according to the invention may include applying a first external magnetic field having a first orientation relative to the GMR sensor to the GMR sensors from a magnetic field source, biasing GMR sensors facing a first direction with a first electrical reset waveform during application of the first external magnetic field, wherein said first electrical reset waveform ends at a first time, reversing the polarity of the magnetic field after the first time to apply a second magnetic filed having a second, opposite orientation relative to the GMR sensor, biasing the GMR sensors facing a second direction with a second electrical reset waveform during application of the second magnetic field, wherein said second electrical reset waveform ends at a second time and removing the second external magnetic field after the second time.

Another aspect of the present invention is that an apparatus according to the present invention includes at least one GMR sensor, a suspension, coupled to the at least one GMR sensor, for supporting the at least one GMR sensor and a reset-waveform generator, operatively coupled to the at least one GMR sensor, for generating a reset waveform for resetting the at least one GMR sensor.

Another aspect of the present invention is that the invention may further include a read/write module, wherein the read/write module interfaces with the reset-pulse generator to provide the reset pulse to at least one GMR sensor.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 10a–b illustrate fly-back circuit schemes for generating a negative reset pulse;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for re-initializing a GMR head after losing initialization is disclosed. The invention uses a voltage waveform rather than a current pulse to reinitialize a GMR head. Furthermore, according to a further aspect of the invention a stack of GMR heads may be reinitialized having the same magnetic orientation to preclude adverse effects on the playback signals of half of the heads. In addition, improvements in re-initializing GMR heads is provided by implementing reset voltage wave shaping. The invention can also provide re-initialization of GMR heads at different points in the manufacturing process/or in the disk drive.

Figure 1:
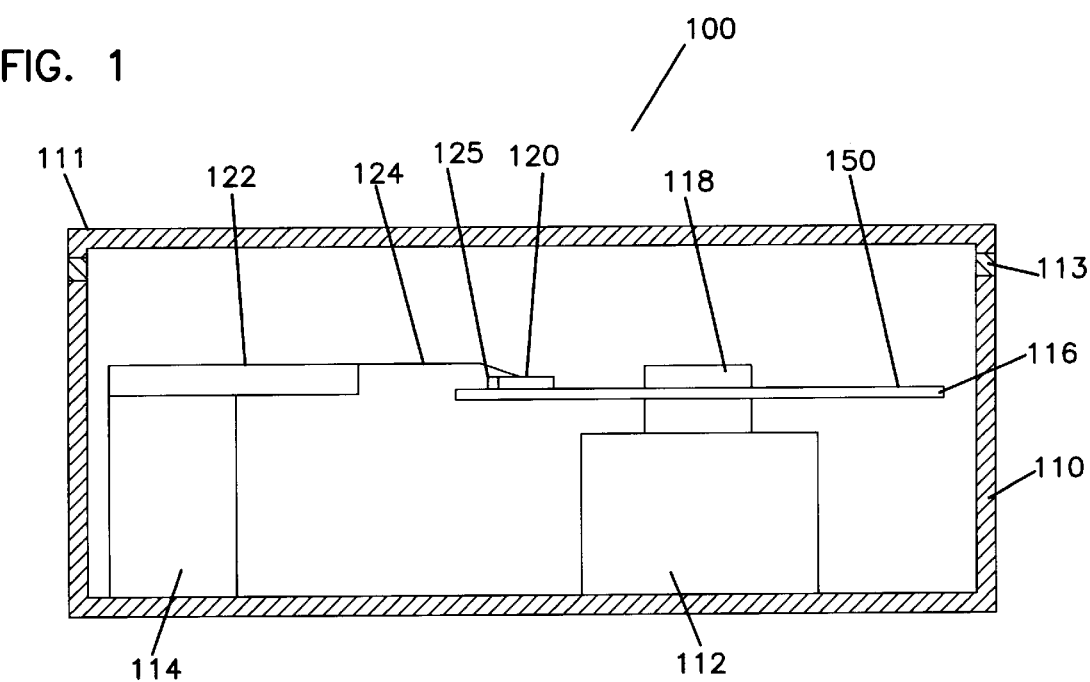
FIG. 1 illustrates a simplified block diagram of a magnetic recording disk drive for use with the GMR sensor and recovery system according to the present invention.

FIG. 1 illustrates a magnetic recording disk drive 100 operable with an GMR sensor as the read head and the GMR sensor reset mechanism of the present invention. The disk drive comprises a base 110 to which are secured a disk drive motor 112 and an actuator 114, and a cover 111. The base 110 and cover 111 provide a substantially sealed housing for the disk drive. Typically, there is a gasket 113 located between base 110 and cover 111 and a small breather port (not shown) for equalizing pressure between the interior of the disk drive and the outside environment. A magnetic recording disk 116 is connected to drive motor 112 by means of hub 118 to which it is attached for rotation by the drive motor 112. A thin lubricant film 150 is maintained on the surface of disk 116. A read/write head or transducer 125 is formed on the trailing end of a carrier, such as an air-bearing slider 120. Transducer 125 is typically an inductive write element with a GMR sensor read element (not shown in FIG. 1). The slider 120 is connected to the actuator 114 by means of a rigid arm 122 and a suspension 124. The suspension 124 provides a biasing force that urges the slider 120 onto the surface of the recording disk 116.

During operation of the disk drive, the drive motor 112 rotates the disk 116 at a constant speed, and the actuator 114, which is typically a linear or rotary voice coil motor (VCM), moves the slider 120 generally radially across the surface of the disk 116 so that the read/write head may access different data tracks on disk 116. As is well known in the art the read element reads not only data but also servo positioning information prerecorded on the disk, typically in servo sectors angularly spaced around the disk and located in the data tracks. The servo information is read and processed by a digital control system to control the amount of current sent to the VCM. In this manner the head is maintained on track during read and write operations and accurately moved across the tracks to read and write on all the tracks.

Figure 2:
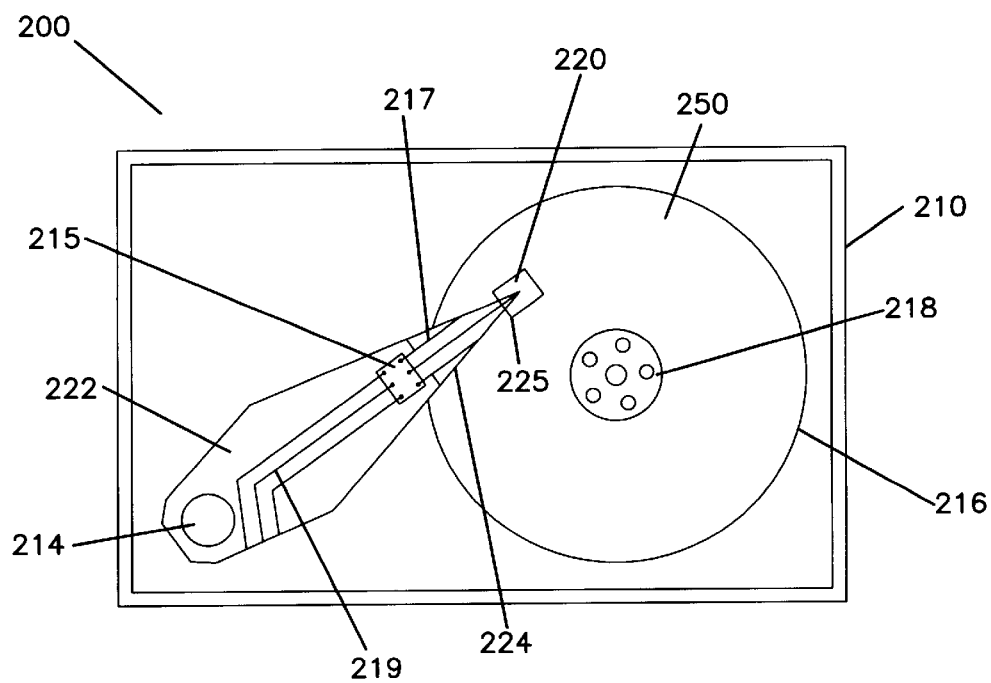
FIG. 2 is a top view of the disk drive of FIG. 1 with the cover removed.

FIG. 2 is a top view 200 of the interior of the disk drive with the cover removed, and illustrates in better detail the suspension 224 that provides a force to the slider 220 to urge it toward the disk 216. The suspension may be a conventional type of suspension such as the well-known Watrous suspension, as described in IBM's U.S. Pat. No. 4,167,765. This type of suspension also provides a gimbaled attachment of the slider which allows the slider to pitch and roll as it rides on the air bearing. The data detected from disk 216 by the transducer 225 is processed into a data readback signal by signal amplification and processing circuitry in the integrated circuit arm electronics (AE) module alias read/write module, alias read/write IC, 215 located on arm 222. The signals from transducer 225 travel via flex cable 217 to module 215, which sends its output signals via cable 219.

The above description of the magnetic recording disk drive incorporating the present invention, and the accompanying FIGS. 1 and 2, are for representation purposes only. Disk drives may contain a large number of disks and actuators, and each actuator may support a number of sliders.

Figure 3:
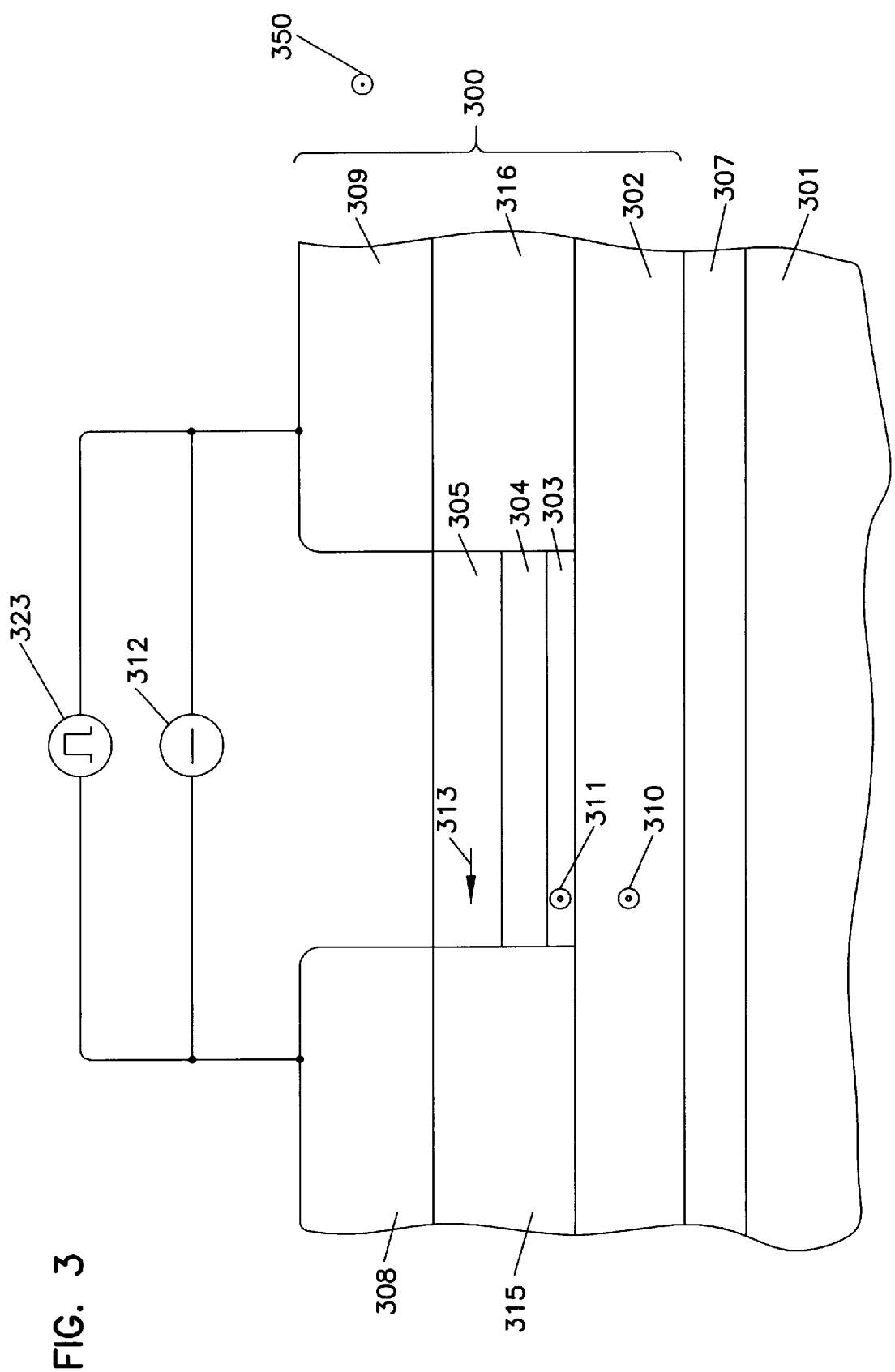
FIG. 3 is a cross-sectional plan view of a spin valve sensor according to the invention.

FIG. 3 depicts an example of a spin valve sensor 300 upon which the invention may be practiced. The view of FIG. 3 depicts a plan view of the air bearing surface of a substrate 301 containing the spin valve 300. The substrate's air bearing surface normally rides upon a cushion of air, which separates it from a magnetic data storage medium such as a disk or tape.

The sensor 300 includes a plurality of substantially parallel layers including an antiferromagnetic layer 302, a ferromagnetic pinned layer 303, a conductive layer 304, and a ferromagnetic free layer 305. The sensor 300 also includes hard bias layers 315–316, the operation of which is discussed in greater detail below. The sensor 300 is deposited upon an insulator 107, which lies atop the substrate 301. Adjacent layers preferably lie in direct atomic contact with each other.

The antiferromagnetic layer 302 comprises a type and thickness of antiferromagnetic substance suitable for use as a pinned layer in spin valves, e.g., a 400 Å layer of NiO. The ferromagnetic pinned layer 303 comprises a type and thickness of ferromagnetic substance suitable for use in spin valves, e.g., about 10–40 Å of Co. The conductor layer 304 comprises a type and thickness of conductive substance suitable for use in spin valves, e.g., about 20–30 Å of Cu. The ferromagnetic free layer 305 comprises a type and thickness of ferromagnetic substance suitable for use as a free layer in spin valves, e.g., about 30–150 Å of NiFe. The hard bias layers 315–316 provide the free layer 305 with a desired quiescent: magnetization. The hard bias layers 315–316 preferably comprise a magnetic material with high coercivity, such as CoPtCr.

Despite the foregoing detailed description of the sensor 300, the present invention may be applied using many different sensor arrangements in addition to this example. For example, ordinarily skilled having the benefit of this disclosure will recognize various alternatives to the specific materials and thickness described above.

The sensor 300 exhibits a predefined magnetization. Magnetization of the sensor 300, including the ferromagnetic layers 303/305 and the antiferromagnetic layer 302, is performed in accordance with the invention. The sensor 300 may be magnetized prior to initial operation, such as during the fabrication or assembly processes. Or, the sensor 300 may be magnetized after some period of operating the sensor 300, where the sensor 300 loses its magnetic orientation due to a traumatic high temperature event such as electrostatic discharge. A process for magnetization of the sensor 100 is discussed in greater detail below.

Whether magnetized before or after initial operation of the sensor 300, the magnetized components of the sensor 300 are ultimately given the same magnetic configuration. In particular, the antiferromagnetic layer 302 has a magnetic orientation in a direction 310. For ease of explanation, conventional directional shorthand is used herein, where a circled dot indicates a direction coming out of the page (like an arrow's head), and a circled x indicates a direction going into the page (like an arrow's tail). The neighboring ferromagnetic pinned layer 303 has a magnetic moment pinned in a parallel direction 311, due to antiferromagnetic exchange coupling between the layers 302–303.

Unlike the pinned layer 303, the free layer 305 has a magnetic moment that freely responds to external magnetic fields, such as those from a magnetic storage medium. The free layer 305 responds to an external magnetic field by changing its magnetic moment, which in turn changes the resistance of the spin valve 300. In the absence of any other magnetic fields, the free layer 305 orients itself in a direction 313, which is oriented 90° to the directions 310–311. This quiescent magnetization direction is due to biasing of the free layer 305 by the hard bias layers 315–316.

The sensor 300 may also include various accessories to direct electrical current and magnetic fields through the sensor 300. A small but constant sense current, for example, is directed through the sensor 300 to provide a source of scattering electrons for operation of the sensor 300 according to the GMR effect. At different times, a relatively large current pulse or waveform is directed through the sensor 300 to establish the magnetization direction of the sensor 300. FIG. 3 also depicts the sensor 300 in relation to the various features that help direct current through the sensor 300.

The sensor 300 is attached to a pair of complementary leads 308–309 to facilitate electrical connection to a sense current source 312. The leads 308–309 also facilitate electrical connection to a pulse current source 323. The leads 308–309 preferably comprise 500 Å of Ta with a 50 Å underlayer of Cr, or another suitable thickness and type of conductive material. The attachment of leads to magnetoresistive sensors and spin valves is a well known technique, familiar to those of ordinary skill in the art.

A technique for establishing a predetermined magnetic orientation of spin valve sensor or GMR head has been developed and is disclosed in copending, and commonly owned U.S. patent application Ser. No. 08/855,141, herein incorporated by reference. This technique will be explained with reference to FIG. 3.

Via the leads 308–309, the pulse current source 323 directs an electrical pulse current through the layers 303–305. Chiefly, the pulse current heats the antiferromagnetic layer 302 past its blocking temperature. For an additional measure of magnetization biasing, the pulse current source 323 may be configured to provide pulse current in an appropriate direction to enhance biasing of the antiferromagnetic layer 302 in the direction 310. The pulse current flows from the lead 309 to the lead 308. To satisfy the foregoing purposes, the current source 323 comprises a suitable device to provide a current pulse of sufficient amplitude and duration to bring the antiferromagnetic layer 302 past its blocking temperature, thereby freeing the magnetic orientations of this layer as well as the associated ferromagnetic pinned layer 303.

In addition to heat, the current pulse also provides a magnetic field that magnetically orients the antiferromagnetic layer 302 in accordance with the well known right-hand rule of electromagnetics. The pulse current lasts sufficiently long to both remove any magnetic orientation of the antiferromagnetic layer and also to reorient the layers in accordance with the magnetic field created by the flowing current.

The magnetic orientation of the antiferromagnetic layer 302 has the effect of pinning the magnetization directions of the ferromagnetic pinned layer 303. This occurs because of the strong exchange coupling between the antiferromagnet-ferromagnet pair 302/303. More particularly, the antiferromagnetic layer 302 pins the ferromagnetic pinned layer 303 in a direction parallel to its own direction. The pulse current source 323 then applies a bias current to orient the magnetic field of ferromagnet layer 305.

Figure 4:
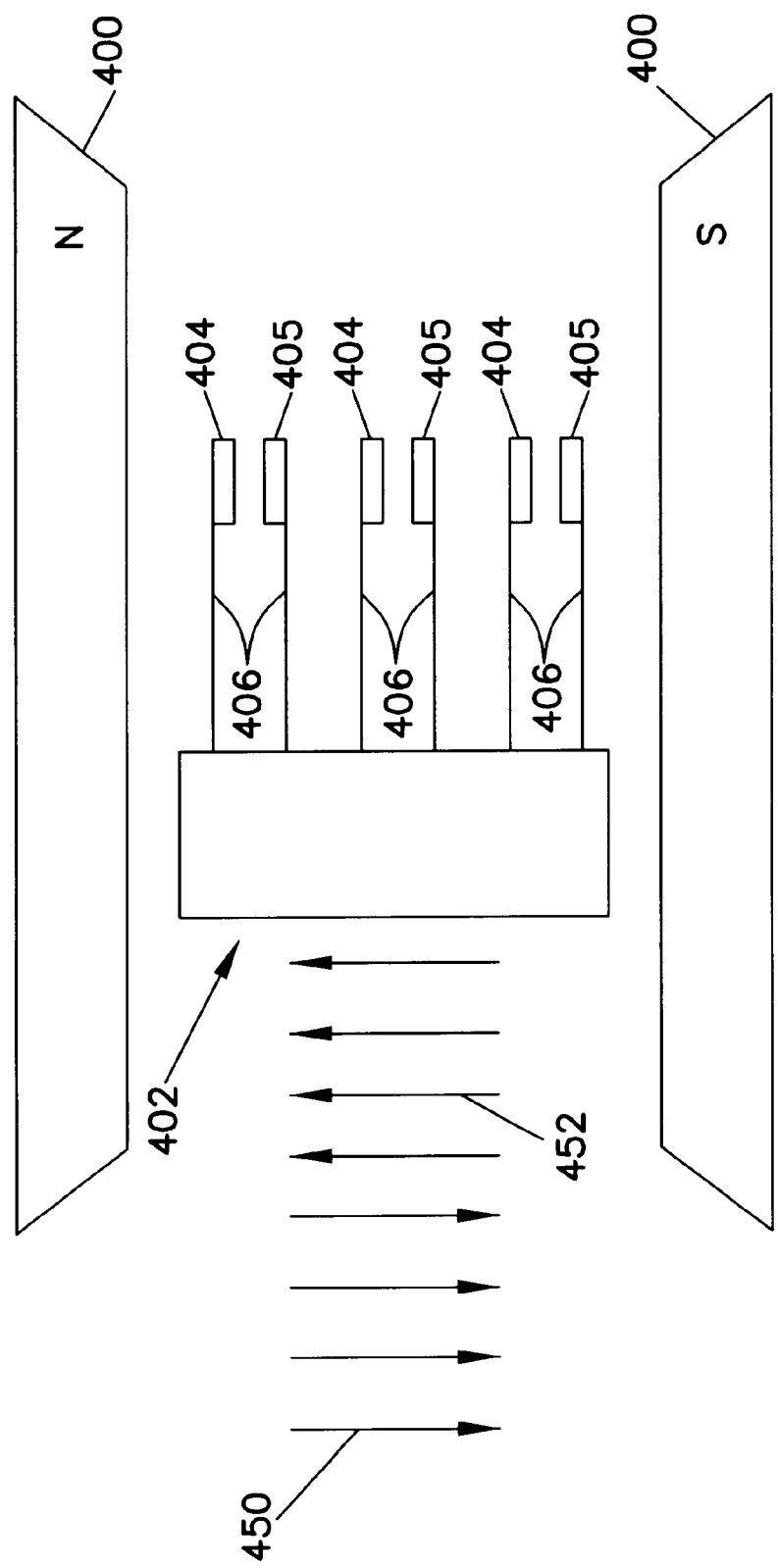
FIG. 4 depicts another technique for establishing a predetermined magnetic orientation of the spin valve sensors or GMR heads.

FIG. 4 depicts another technique for establishing a predetermined magnetic orientation of spin valve sensors or GMR heads, as disclosed in copending and commonly owned U.S. patent application Ser. No. 08/854,978, filed May 13, 1997, hereby incorporated by reference. In FIG. 4, a magnetic field source 400 provides an external magnetic field to reset GMR sensors of an assembled actuator assembly 402 that includes multiple read or read/write heads 404, 405 mounted on corresponding actuator arms 406. The source 400 is operated to introduce an external magnetic field to the sensor 404, 405 after the antiferromagnet layer has been heated past its blocking temperature.

This external field helps overcome the limitations of previous techniques that relied solely upon the internal magnetic field of a current pulse to magnetically orient spin valve antiferromagnetic layers. Accordingly, the external magnetic field ensures that the sensors 404, 405 are oriented by a uniform sufficiently and powerful field.

The magnetic source 400 preferably comprises an electromagnet or another source adequate to generate a magnetic field sufficient to robustly orient the antiferromagnetic layer as desired upon the application of a high current heating pulse to the antiferromagnetic layer. The external magnetic field biases each of the heads 404 in the common direction 450.

The assembly 402, however, contains up-facing heads and down-facing heads, as defined by the direction faced by their air bearing surfaces, depending on whether the head flys on the top or the bottom of a disk. Therefore, the pinned layer magnetic orientation from all up-facing or down-facing heads must be inverted to match the remaining heads' pinned layer polarity.

Nevertheless, these prior techniques for establishing a predetermined magnetic orientation of a GMR head possess several drawbacks. First, the resistance of the stripe may vary due to manufacturing uncertainties. The stripe is lapped at a predetermined height. However, due to the tolerances in the lapping process, the height of the stripe may vary, and the resistance of the stripe is inversely proportional to its height. Accordingly, applying a constant current source will result in some head becoming too hot and thereby damaged, while the other heads will not achieve a temperature above the blocking temperature and thus will not be reset.

Secondly, the orientation of the up-facing and down-facing heads in a GMR head stack that have been reinitialized according to prior techniques result in oppositely aligned heads. This causes deterioration in the playback signals of half of the heads.

Accordingly, a method and apparatus for generating an electrical reset waveform to reset one or more GMR heads to an original magnetic state after exposure to an Electro-Static Discharge (ESD) event or other electrical, thermal or magnetic over-stress event is required.

Figure 5B:
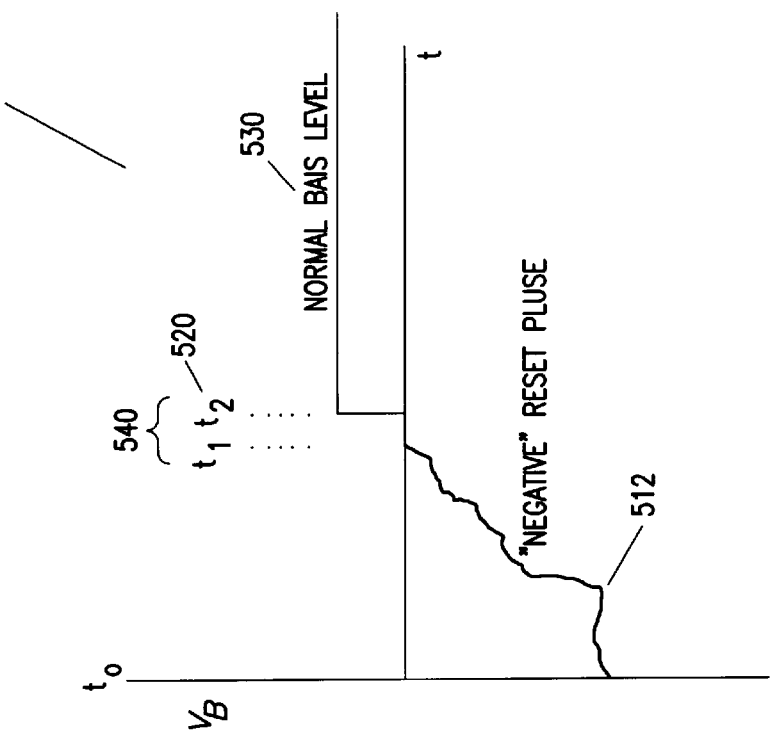
FIGS. 5a and 5b illustrate graphs of a reset voltage waveform that may be applied for re-initializing a GMR head.
Figure 5A:
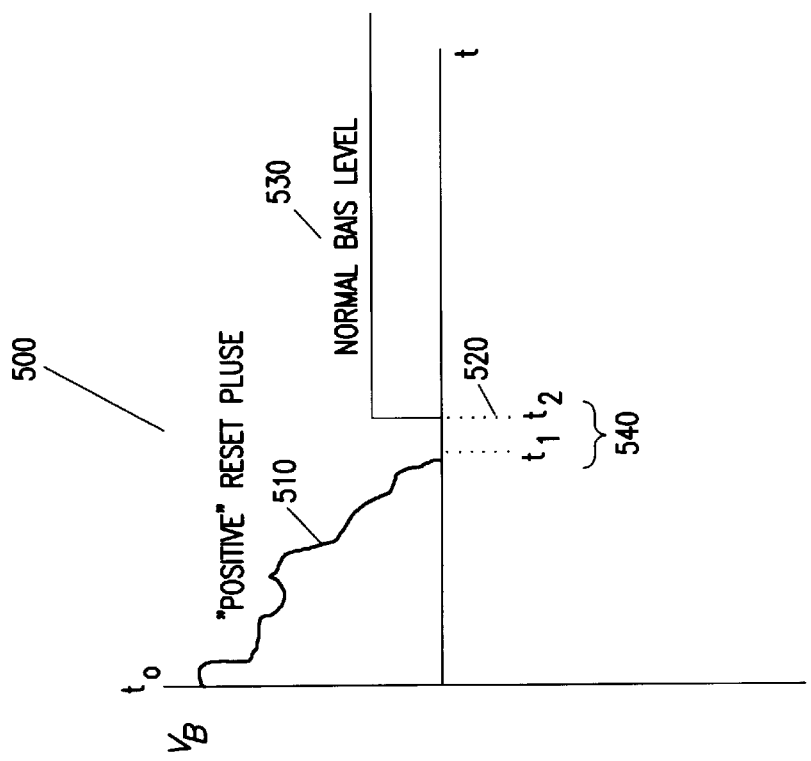

FIGS. 5a and 5b illustrate graphs 500, 502 of a reset voltage pulse 510, 512 that may be applied for re-initializing a GMR head. Depending on the magnetic bias orientation built into the GMR sensor, the reset pulse would be applied in the same voltage polarity as the normal bias current 510, or the opposite polarity 512. The reset pulse may be applied up to time t2 520, which is the beginning of normal bias level 530. Thus, the reset pulse 510, 512 may be immediately followed by the normal bias 530, (i.e., without a zero bias interval 540 (t1=t2)). Accordingly, a voltage reset pulse 510, 512 can be used to reinitialize a GMR head without endangering the head itself.

To overcome the problem experienced in re-initializing oppositely oriented up-facing and down-facing heads in a GMR head stack, the present invention will be further discussed with reference to FIG. 4. As discussed above, a magnetic field source 400 may provide an external magnetic field to reset sensors 404, 405 of an assembled actuator assembly 402 after a pulse signal heats the antiferromagnetic layer past its blocking temperature. However, according to the present invention, only GMR heads facing a first direction, e.g., the downward facing heads 404, are reinitialized by a reset voltage applied to only heads 404 using the magnetic field source 400 biased to produce a first field polarity 450. Thereafter, only the GMR heads facing the second direction, e.g., the upward facing heads 405, are supplied a pulse that heats their the antiferromagnetic layer past its blocking temperature in the presence of the external magnetic field source 400 having its field polarity reversed 452. Thus, all heads 404, 405 will be reinitialized with the same orientation thereby eliminating the deterioration of the playback signals of heads 404 or heads 405.

The technique may be applied in manufacturing from stack assembly to the completion of the disk drive. It may be applied uniformly for all heads whether needed or not, or it may be performed only after a head has been diagnosed as needing resetting. It can then be performed on that particular head only, or on all heads of a stack.

In re-initializing GMR heads, a sufficient pulse for heating the antiferromagnet layer above its blocking temperature may be achieved without using a step pulse. Sharp step pulses are difficult to achieve. In addition, the initial large heating pulse must be reduced to a lower level or the normal bias signal must be applied in order to keep oriented the magnetic layers until the antiferromagnet layer falls below its blocking temperature.

Figure 6A:
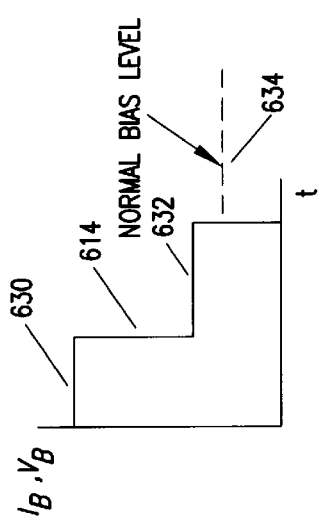
FIGS. 6a–e illustrate reset voltage waveforms according to the present invention for re-initializing a GMR head.

FIGS. 6a–e illustrate signal waveforms 610, 612, 614, 616 according to the present invention for re-initializing a GMR head. FIG. 6a illustrates a negative exponential decaying pulse 610. The pulse 610 in FIG. 6a has an initial amplitude 620 and duration 622 such that the GMR sensor's material is heated above the blocking temperature associated with the sensor's structure. The decay rate (i.e. the slope) of the reset pulse 610, is chosen such that the decay rate of the GMR sensor's material temperature is faster than the decay rate of the reset pulse 610. At the moment at which the GMR sensor's material temperature drops below its blocking temperature, the remaining amplitude of the reset pulse 610 produces a magnetic field sufficient to orient the magnetic bias layers of the GMR sensor. When the temperature falls farther, this orientation is "frozen in."

Figure 6B:
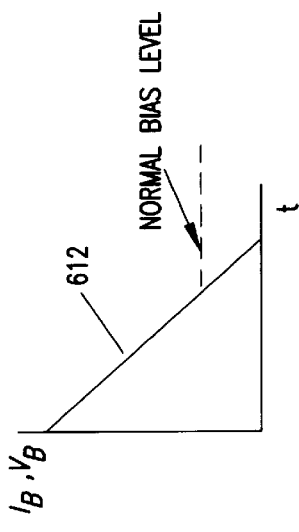
Figure 6C:
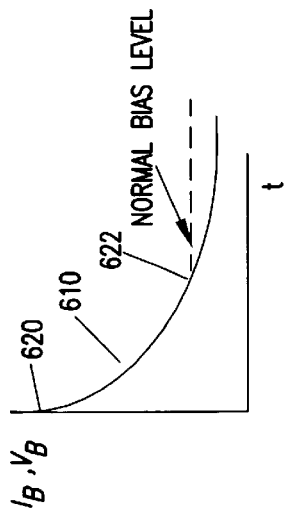
Figure 6D:
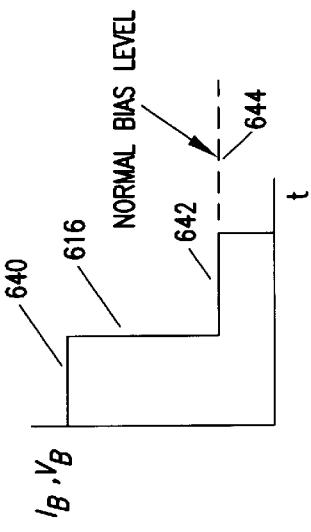

The reset pulse shape may be a negative exponential decaying pulse 610 as shown in FIG. 6a, or alternatively, the reset pulse shape may be in the form of a ramp 612 as shown in FIG. 6b, or a staircase 614, 616 as shown in FIGS. 6c and 6d. The stair case pulse 614 of FIG. 6c provides a first step value 630 for heating the GMR sensor's material above its blocking temperature and a final magnetically orienting step value 632 that is above the normal bias level 634. The stair case of FIG. 6d provides a final orienting step value 642 that is equal to the normal bias level 644.

Figure 6E:
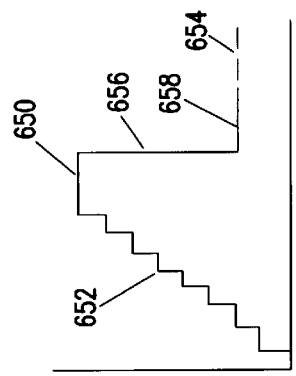

FIG. 6e illustrates a waveform wherein the peak amplitude 650 is determined by sequentially increasing 652 the amplitude until the blocking temperature is achieved so that the GMR sensor will not evidence readback error conditions. Thereafter, the waveform drops 656 to a second level 658 which may be equal to the normal bias level 654.

Those skilled in the art will readily recognize that the reset pulse shapes apply to both positive reset pulses as shown in FIGS. 6a–e or to negative reset pulses (not shown), wherein positive reset pulses are of a voltage polarity the same as that created by the normal bias current and negative reset pulses are a voltage polarity opposite to that of the normal bias current. In addition, those skilled in the art will recognize that the amplitude of the waveforms described in FIGS. 6a–e may be selected to cause resetting of the magnetic orientation of the GMR sensor only after being directed across the GMR sensor a plurality of times. Since the magnetics of a GMR sensor are not stable, applying a reset waveform of a substantially equal magnitude multiple times may be successful in resetting the magnetic orientation of the GMR sensor even if unsuccessful on the previous application.

Figure 7A:
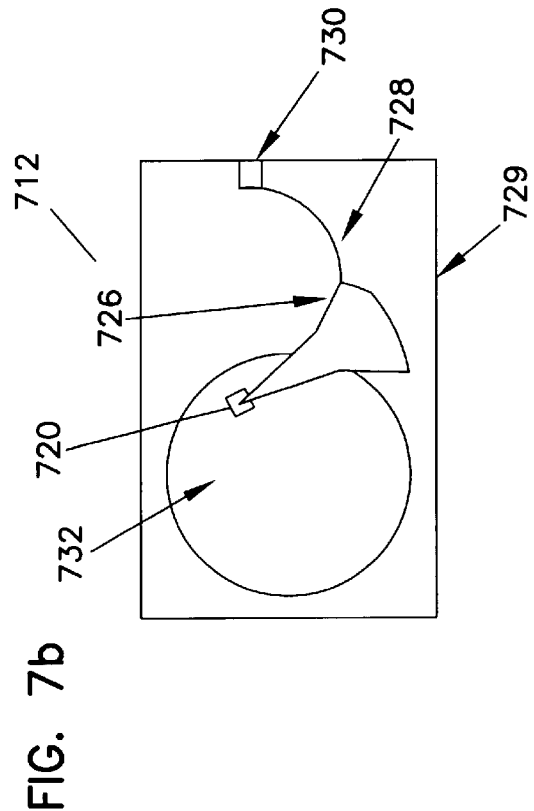
FIGS. 7a–c illustrate the assembly levels at which GMR sensors can be reset according to the present invention.
Figure 7B:
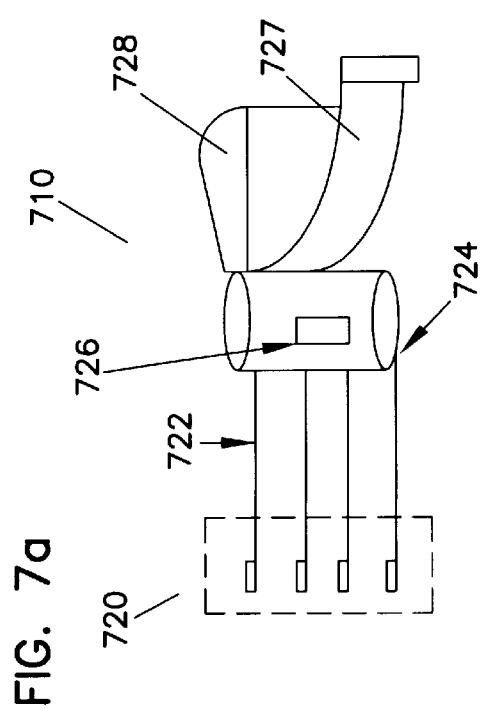
Figure 7C:
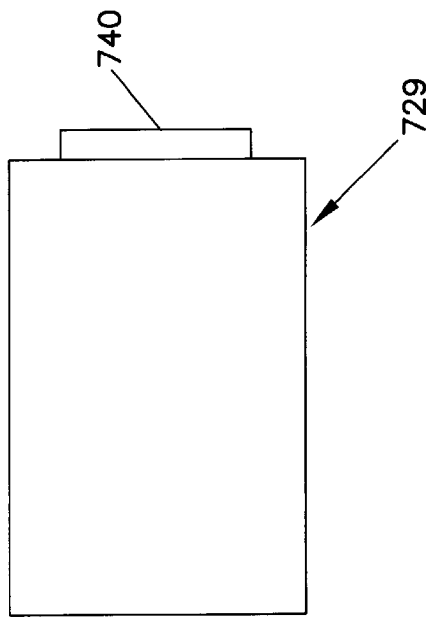

FIGS. 7a–c illustrate the assembly levels 710, 712, 714 at which GMR sensors can be reset according to the present invention. FIG. 7a illustrates an actuator assembly level. In FIG. 7a, GMR sensors 720 are held by suspensions 722 on actuator arms 524. A read/write module 726 is provided for processing read and write signals carried via flex cable 727. A voice coil 728 is used to control the positioning of the GMR sensors 720 over a recording media (not shown in FIG. 7a).

In the actuator assembly level of FIG. 7a, a reset pulse according to the present invention can be applied externally to all GMR sensors 720 (gang reset) or to only those GMR sensors 720 which are determined to be in need of resetting (selective reset), e.g., demonstrate a poor read-back signal amplitude. For the latter case, the read/write module 726 is inactive (i.e. this implementation yields an external reset). The read/write module 726 includes associated electronic packaging such as the wire bonding and encapsulation.

FIG. 7b illustrates the next assembly level, that of the disk enclosure level 712. In FIG. 7b, GMR sensors 720 are reset externally or internally within a disk enclosure 729 by means of the R/W module 726 via flex cable 728 which is connected to disk enclosure connector 730. FIG. 7b illustrates a GMR sensor 720 positioned over a disk 732.

FIG. 7c illustrates the completed disk drive assembly level 714 wherein the GMR sensors can only be internally reset via the R/W module. The completed disk drive assembly includes a disk enclosure 729 for sealing a hard drive circuit therein. This last implementation yields an internal reset and can also be used for an in-the-field reset. In addition, the internal and external reset may be combined where the read/write module's connections to the GMR sensors are utilized. A system interface 740 is provided for controlling the disk drive.

There are two electrical implementations associated with the external and internal resets illustrated in FIGS. 7a–c. Further, these electrical implementations may be combined to have an external/internal implementation.

Figure 8:
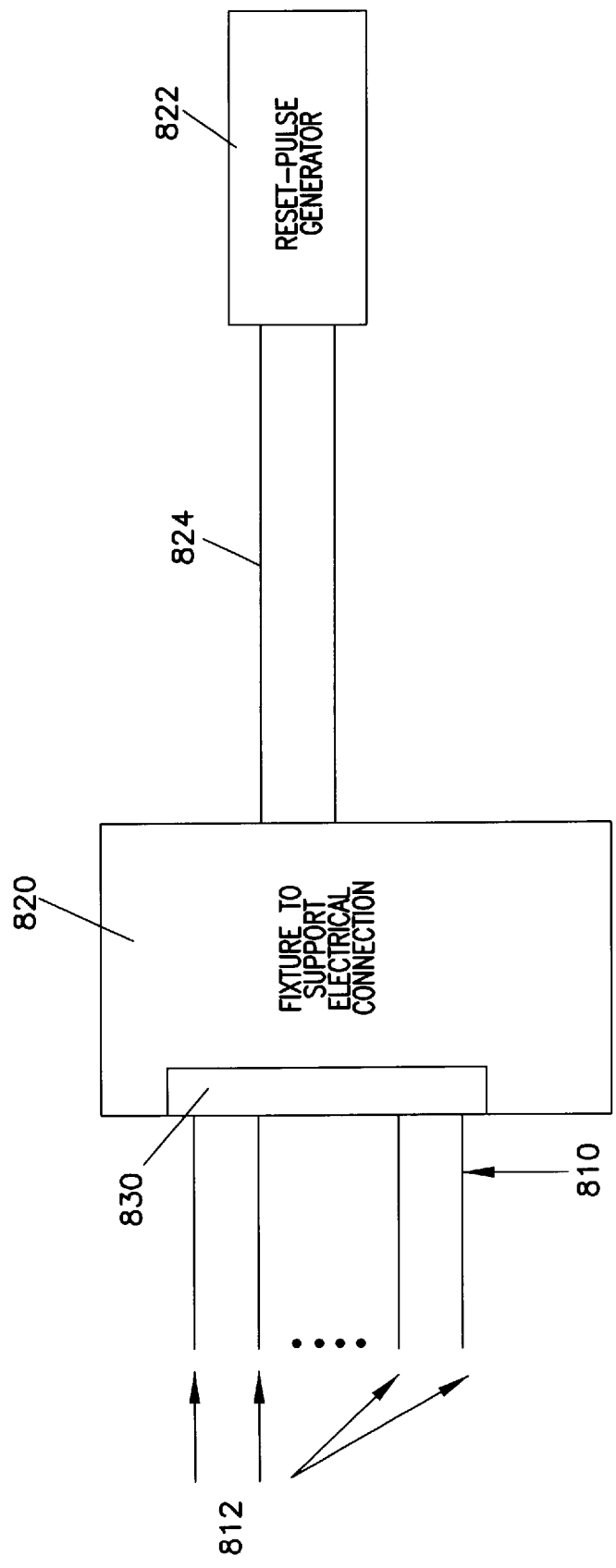
FIG. 8 illustrates a block diagram of the external electrical implementation according to the present invention.

FIG. 8 illustrates a block diagram 800 of the external electrical implementation according to the present invention. The external electrical implementation includes supports 810 for supporting GMR sensors 812, the mechanical fixture 820 that facilitates the electrical connection to the GMR sensors 812, a reset-pulse generator 822, and the electrical connection 824 from the function generator to the GMR sensor 812. The methods described above can be implemented individually or collectively to all the GMR sensors 812. Connection to all GMR sensors 812 may be selectively control using a multiplexer 830 in series with the electrical connections. For a selective reset, the decision of whether or not to reset the GMR sensor 812 may be based on the results of performance tests.

Error conditions may be detected by analyzing the read-back amplitude, by monitoring data error rates, by detecting whether a hard error occurs or by using a quasi-static GMR sensor response test. A quasi-static GMR sensor response test is performed by reading a slowly increasing magnetic field in the direction in which the GMR sensor is sensitive and then measuring the resistance of the GMR sensor or the output of the pre-amplifier as a function of the magnetic field.

The reset-pulse generator 822 may be programmable or designed to provide the required reset pulse for resetting the GMR sensors 812. In addition, the reset-pulse generator 822 may be a voltage or current type with the same or opposite polarity as the normal bias used during normal operation. The electrical connection 824 can be a test probe where the test pins contact the bonding pads which are connected to the GMR sensors 812.

Figure 9:
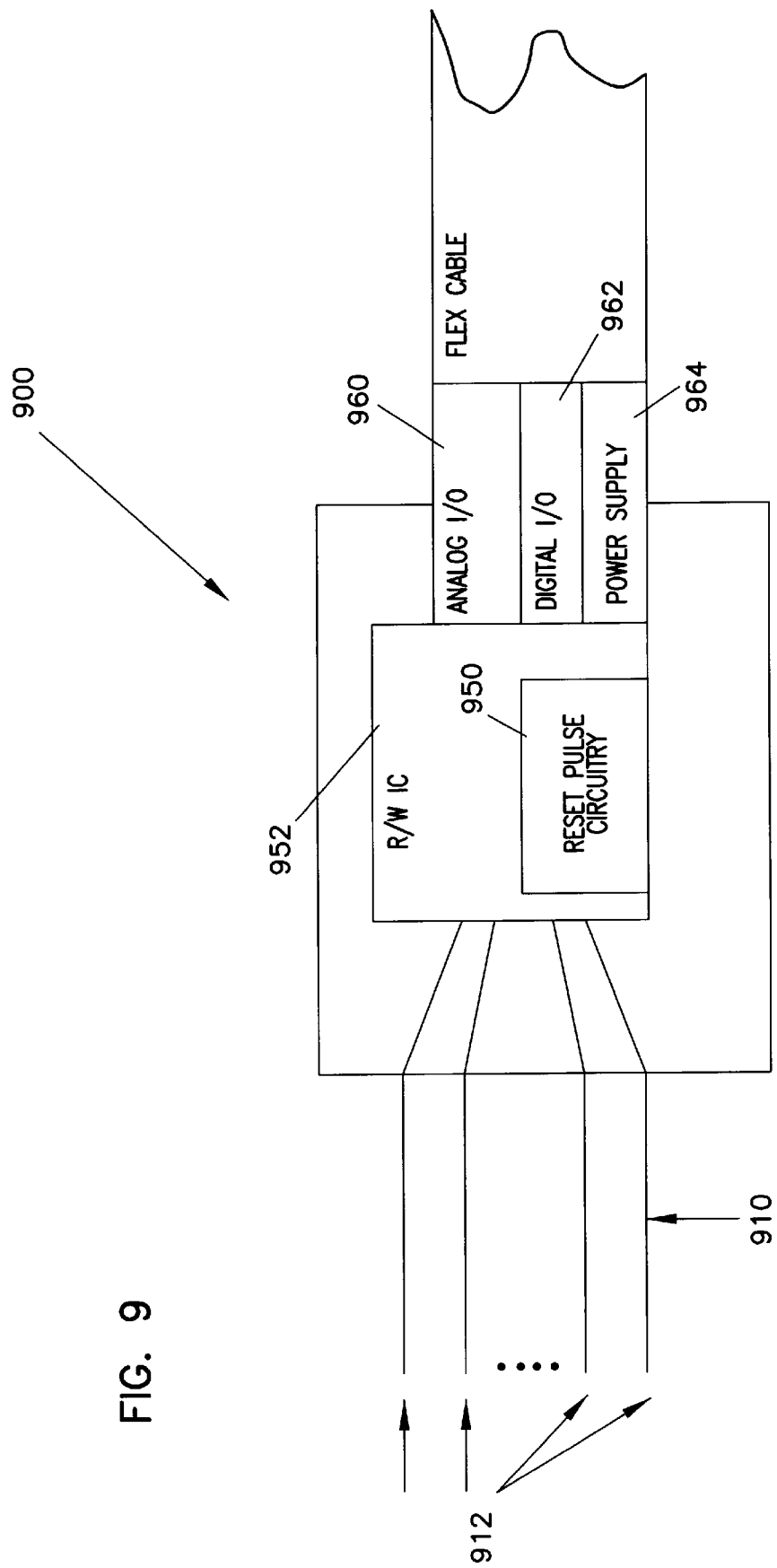
FIG. 9 illustrates a block diagram of an internal electrical implementation according to the invention.

FIG. 9 illustrates a block diagram 900 of an internal electrical implementation according to the invention. The internal electrical implementation utilizes existing electrical connections as well as added reset-pulse circuitry 950 located in the read/write circuit 952. The complexity of the reset-pulse circuitry 950 depends on the number of GMR sensors 912 attached to the read/write circuit 952. Either the analog 960 or digital 962 input/output lines may be used for controlling the reset-pulse circuitry 950. In addition, all of the internal electrical implementations may be used with a read/write module 952 that is of the single-ended or differential design.

For GMR sensors 912 requiring positive reset pulses with a read/write module 952 using a single or dual power supply, the reset-pulse circuitry 950 uses the power supply voltage 964 to create the required characteristics for the reset pulse.

Similarly for GMR sensors 912 requiring negative reset pulses with a read/write module 952 using a dual power supply, the reset-pulse circuitry 950 uses the power supply voltage 964 to create the required characteristics for the reset pulse.

In addition, when a negative reset pulse is required a single power supply with a differential amplifier may be used with the read/write module 952. For this configuration, the voltage potential of the GMR sensor 912 is controlled to a voltage between ground and the power supply voltage.

FIGS. 10a–b illustrate fly-back circuit schemes 1000, 1010 for generating a negative reset pulse. Here, the read/write module uses only a single power supply, one terminal of which is grounded. In that case, a negative reset pulse can be obtained with additional circuitry, a fly-back design, using the power supply voltage 1012, switches 1014, 1016, and reactive elements 1020, 1022 to accommodate the negative reset pulse. Two fly-back topologies may be used: one uses an inductor 1020, and the other uses a capacitor 1022. FIG. 10a uses the inductor 1020 for generating the negative reset pulse. FIG. 10b uses the capacitor 1022 for generating the negative reset pulse.

The circuits illustrated in FIGS. 10a–b induce a fly-back voltage or current to create a voltage potential less than the ground potential. The fly-back current or voltage is then used to supply the bias required to create the reset pulse. Alternatively, the fly-back current or voltage can be used by itself to produce the reset pulse.

In FIGS. 10a–b, the current 1024 or voltage 1026 is induced with a first switch 1014 closed and a second switch 1016 is open. Later at the reset time (t2), the first switch 1014 is opened and the second switch 1016 is closed, and the fly-back current or voltage is then utilized to produce the required reset pulse for a GMR sensor reset. The switches, 1014, 1016, may be implemented with standard active silicon devices such as: bipolar, CMOS, JFET, and MOSFET transistors. The diodes, D1 1032 and n×D1 1030 shown in FIGS. 10a–b, may also be replaced by switch type active silicon devices. The output, $I_{out}$ 1040 or $V_{out}$ 1042, of the fly-back circuit connects to the wave-shaping circuit as shown in FIG. 11.

Figure 11:
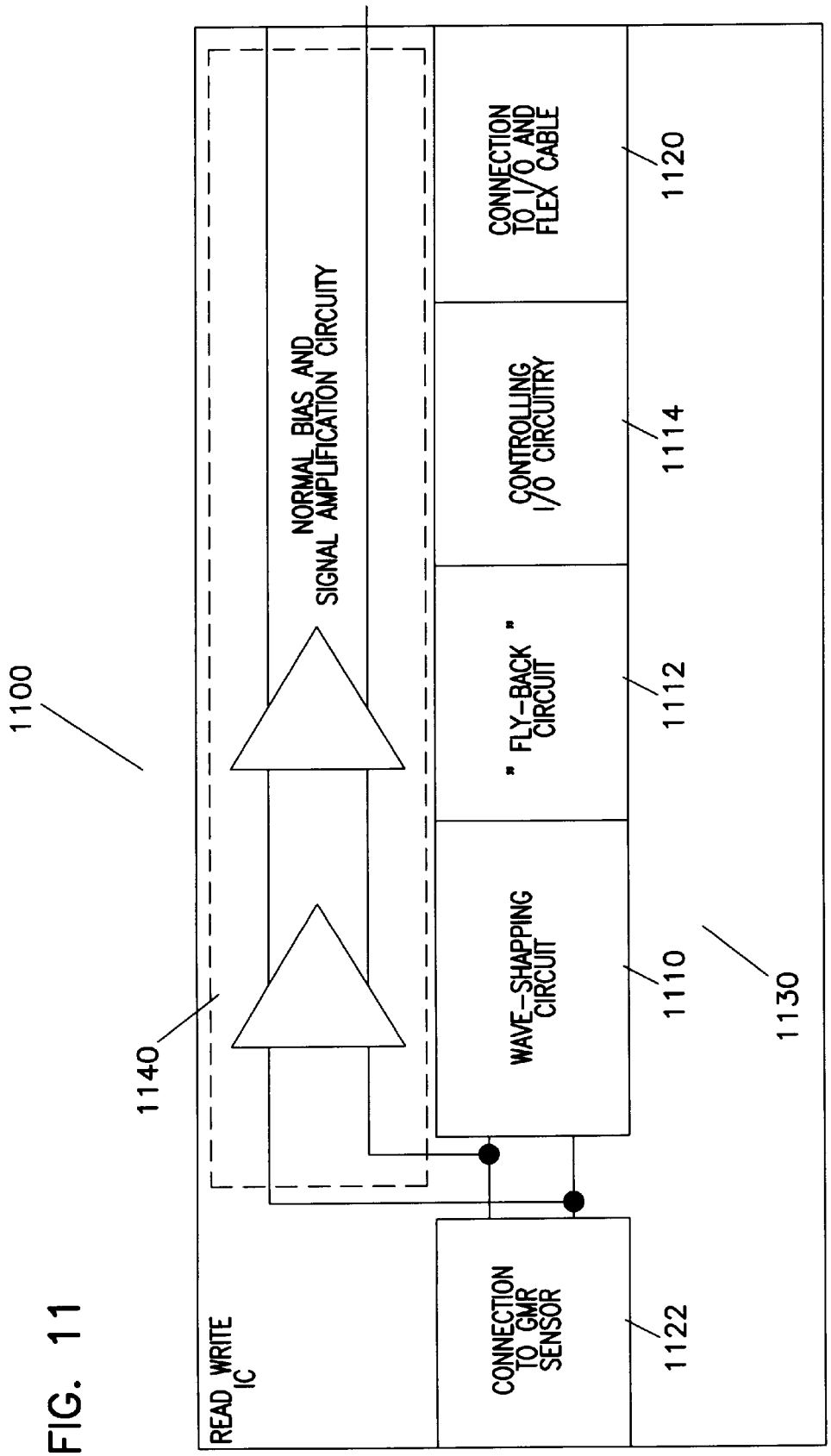
FIG. 11 illustrates an electrical block diagram of the internal circuitry for the read/write module.

FIG. 11 illustrates an electrical block diagram 1100 of the internal circuitry for the read/write module. FIG. 11 shows the arrangement of the wave-shaping 1110, the fly-back 1112 and the controlling I/O circuits 1114. In FIG. 11, the wave-shaping circuit 1110 shapes the reset pulse to the required characteristics for resetting the GMR sensor. Existing electrical connections 1120, 1122 are utilized. The complexity of the reset-pulse circuitry 1130 depends on the number of GMR sensors, the required wave shaping characteristics, and whether a positive or negative reset pulse is required. FIG. 11 includes the fly-back circuit for negative reset pulses. Normal bias and signal amplification circuitry 1140 is included in read/write module.

Figure 12:
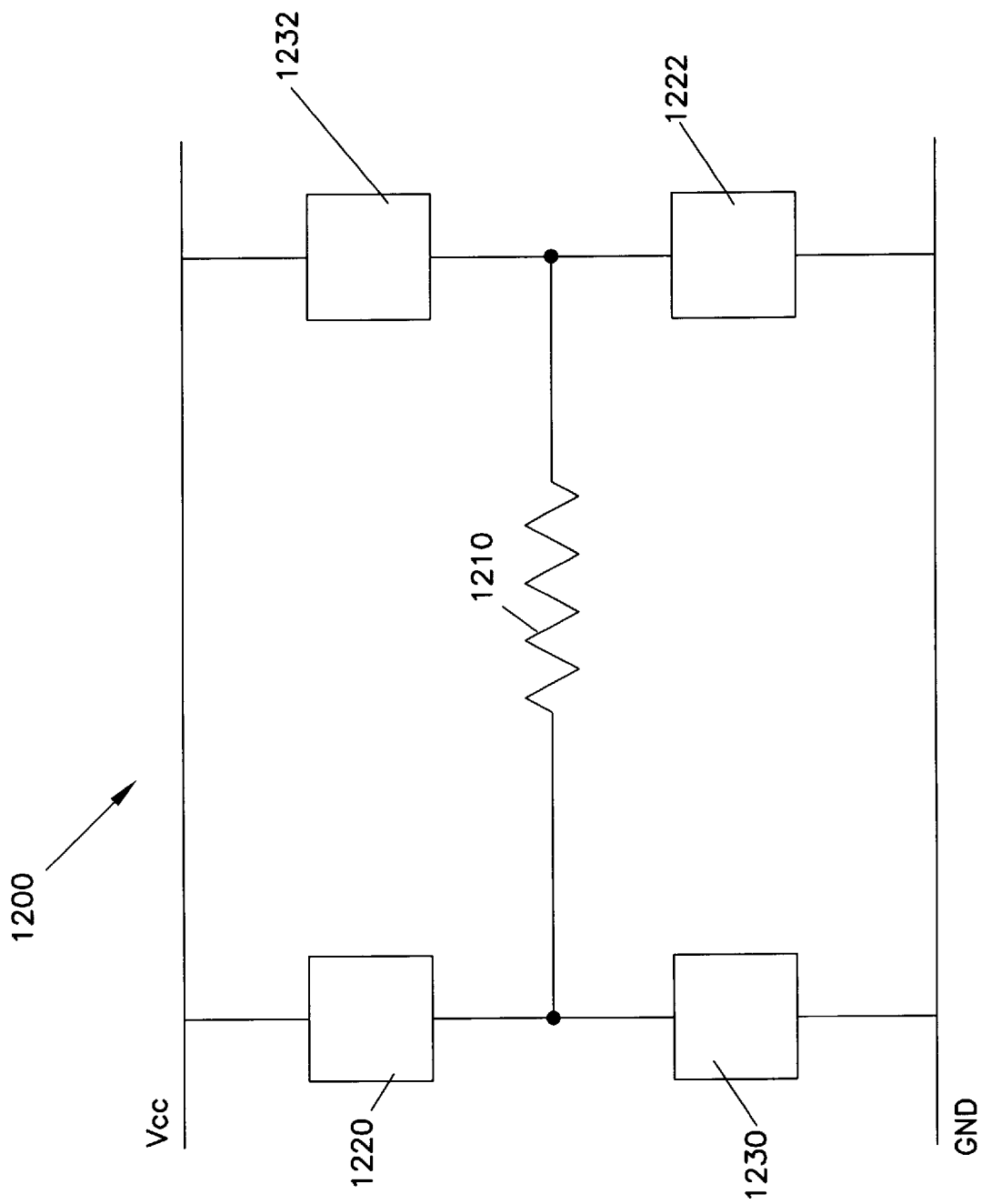
FIG. 12 illustrates an H-drive circuit according to the present invention.

In addition, for reverse bias method, a H-driver configuration such as that which is used in the write driver for an inductive bead, can be used. FIG. 12 illustrates an H-driver circuit 1200. The H-driver configuration has the GMR sensor 1210 as the load. The polarity of the reset voltage $V_R$ applied to the GMR sensor 1210 will be controlled by the logical state of the input to the H-driver.

For example, the GMR sensor 1210 may be positively biased by closing switches 1220, 1222 and opening switches 1230, 1232. A reverse polarity for the GMR sensor 1210 may be accomplished by opening switches 1220, 1222 and closing switches 1230, 1232. The duration of the reverse bias can be controlled by a timing circuit or a pulsed control line to the H-driver switches. Alternate embodiments of the H-driver for the reverse bias method may include active devices, e.g., transistors, rather than switches 1220, 1222, 1230, 1232.

Figure 13:
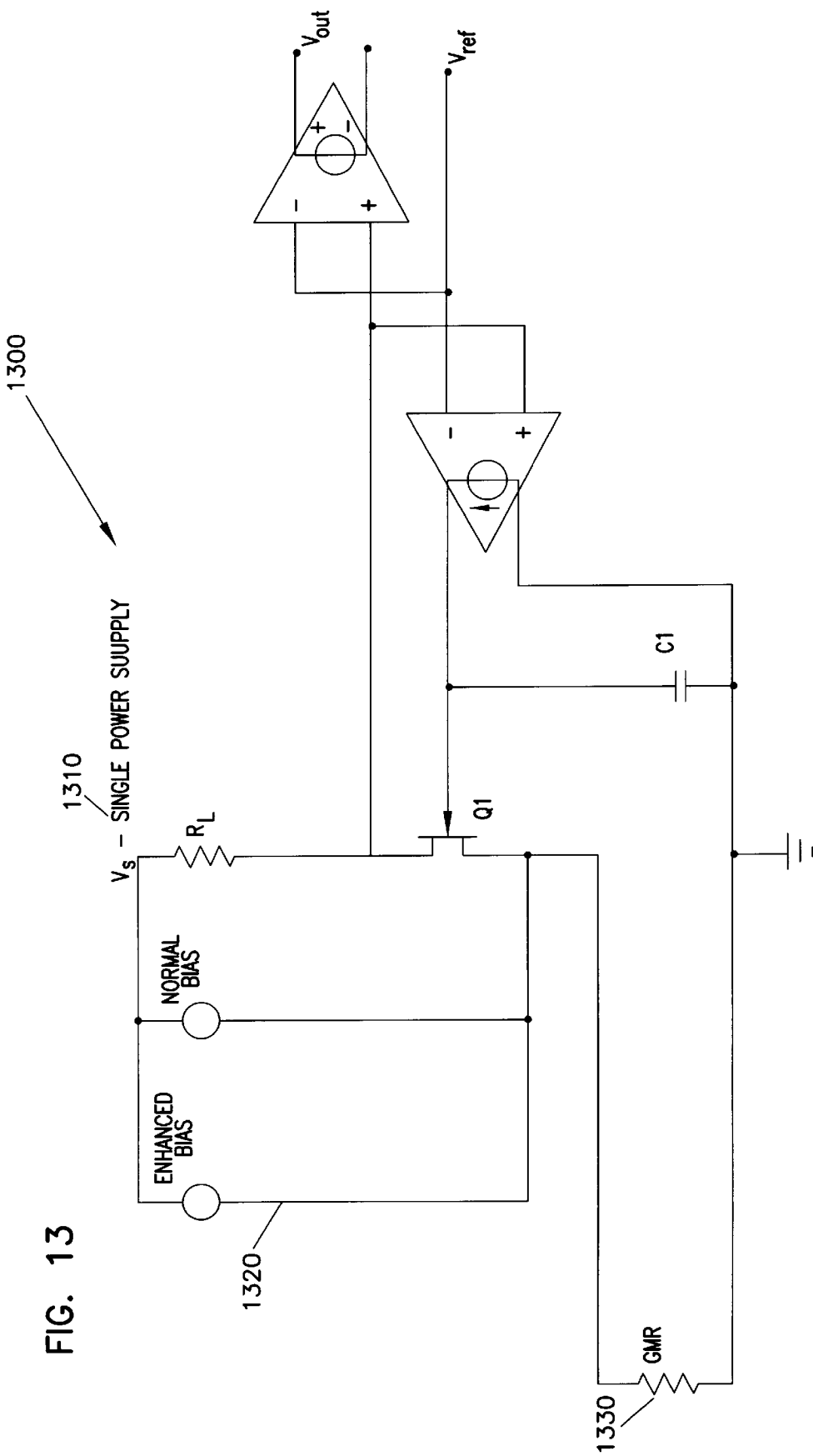
FIG. 13 illustrates a circuit diagram of a single-end input bandpass amplifier according to the present invention.

The enhanced bias method is another type of reset-pulse circuitry for resetting GMR sensors. The enhanced bias method utilizes existing normal bias circuitry to provide a temporarily increased bias for a reset. FIG. 13 illustrates a circuit diagram of a single-end input pre-amplifier 1300. The single-ended amplifier 1300 of FIG. 13 uses a single power supply 1310 with a waveshaping device 1320 for resetting a GMR sensor 1330. For example, the waveshaping device may be a digital-to-analog converter (DAC). By using a DAC for the waveshaping device 1320, a voltage pulse can be created having any shape including a stepped waveform as shown in FIG. 6e. An energy storage device, such as capacitor $C_1$, provides an exponential decay to the trailing end of the pulse.

Figure 14:
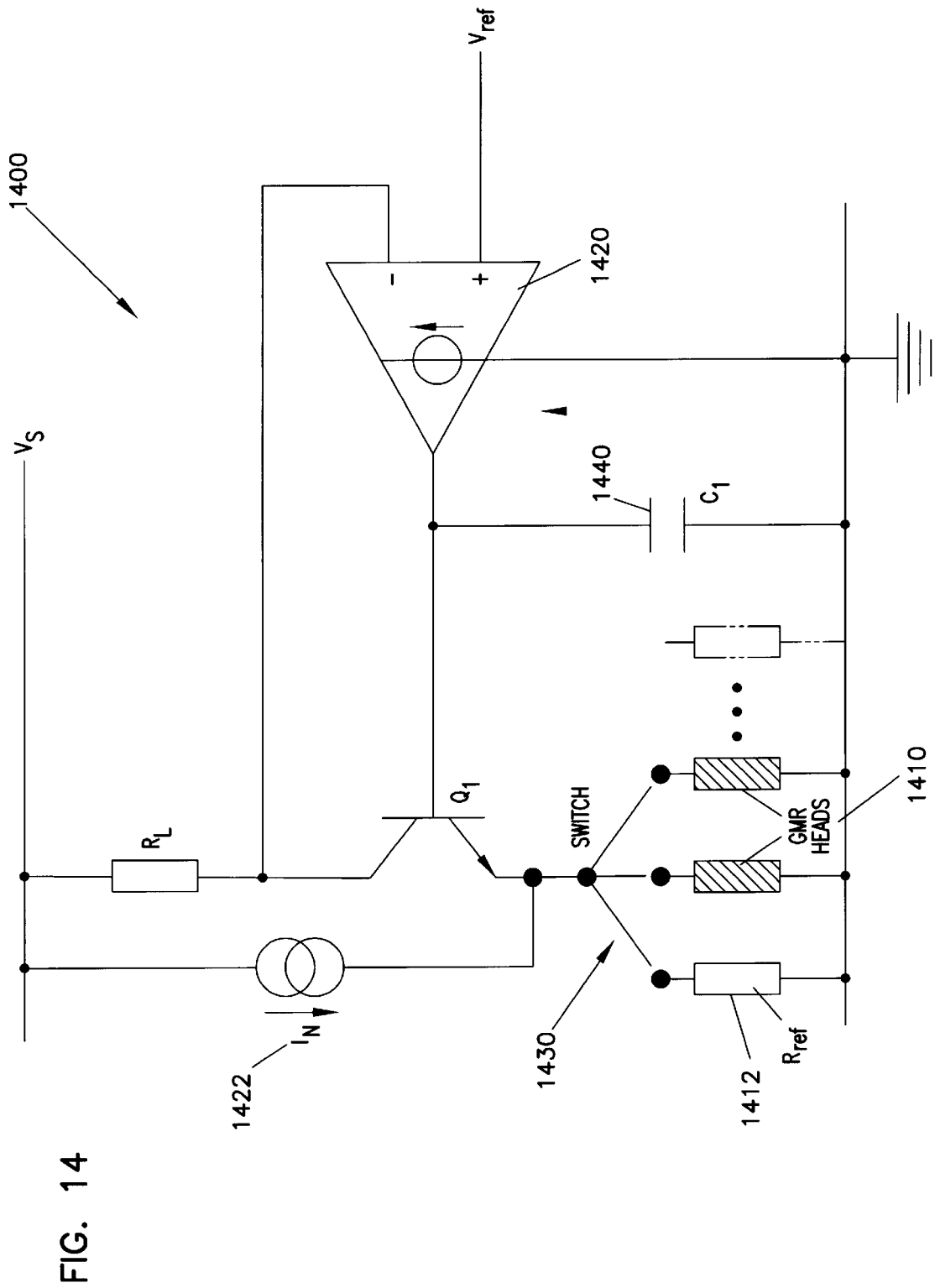
FIG. 14 is a circuit for performing an increased bias for resetting a GMR sensor or head.

FIG. 14 is a circuit 1400 for performing an increased bias for resetting a GMR sensor or head. Once a determination has been made to reset a GMR sensor 1410, a reference head position 1412 is selected. The resistance value of the reference head 1412 is chosen to be higher than the resistance of the GMR head 1410. The pre-amplifier 1420 then controls the bias current through the reference head 1412 to be equal to the nominal bias current 1422.

Now, the circuit 1400 switches to the GMR head 1410 to be reset using a switch 1430. The bias control circuit, containing the operational transconductance amplifier 1420, will initially apply the same voltage to this GMR head 1410 as the voltage it applied to the reference head 1412. This is due to the presence of capacitor $C_1$ 1440 in the bias control loop of FIG. 14. Only after a certain response time (of the control loop) has elapsed will the bias be equal to the nominal bias current though the GMR head 1410. Accordingly, a waveform such as illustrated in FIG. 6a is produced.

The switching from the reference head 1412 to the GMR head 1410 to be reset causes an initial voltage pulse across the GMR head 1410 larger than the normal bias voltage. The magnitude of this voltage is:

$$R_{ref} \times I_{bias},$$

where $R_{ref}$ is the resistance at the reference position and $I_{bias}$ is the steady state bias current, which is the same for all heads. The reference head position 1412 can be a single mode selection, where the resistance can be a programmable resistance defined by a series or parallel combination or a resistor network selectable by a selection circuit.

Figure 15:
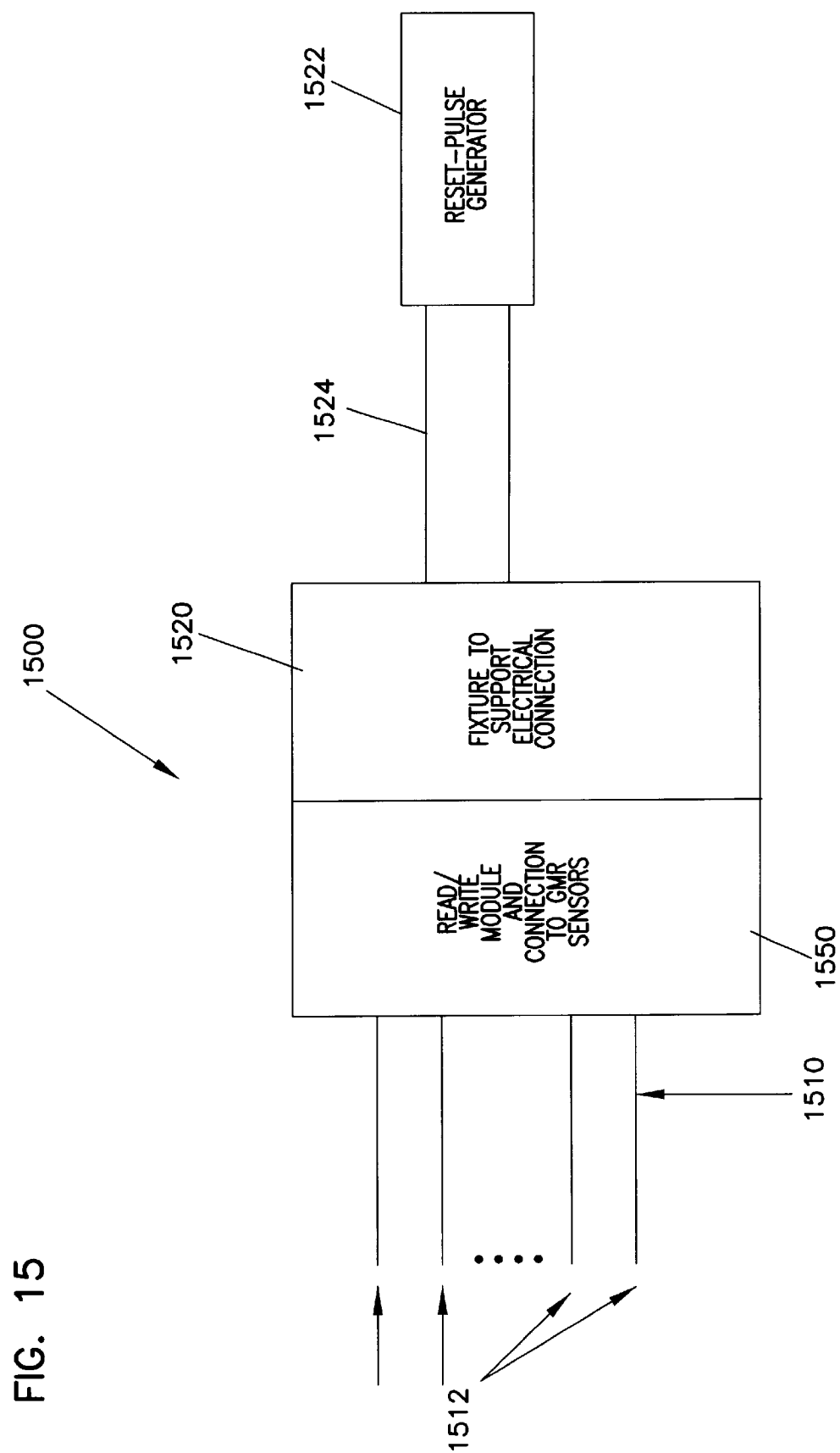
FIG. 15 illustrates a block diagram of the external/internal electrical implementation.

FIG. 15 illustrates a block diagram 1500 of the external/internal electrical implementation. The external/internal electrical implementation includes supports 1510, GMR sensors 1512, the mechanical fixture 1520 for facilitating electrical connection to the GMR sensors 1512, a reset-pulse generator 1522, the electrical connection 1524 from the reset-pulse generator 1522 to the GMR sensor 1512, and a read/write module 1550. For this implementation, the R/W module 1550 provides the electrical connection to the GMR sensors 1512 and analog I/Os 1524 are used to connect to the reset-pulse generator 1522. The analog I/O connection(s) 1524 may either individually access a GMR sensor 1512 or access the GMR sensors 1512 in parallel. The reset-pulse generator 1522 is used as described in the external implementation above.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for establishing a predetermined magnetic orientation of a GMR sensor, comprising the steps of:

applying a first external magnetic field to the GMR sensor, the first external magnetic field having a first orientation relative to the GMR sensor;

during application of the first external magnetic field, directing an electrical voltage waveform across the GMR sensor in a first direction, said voltage waveform ending at a first time; and after the first time, removing the first external magnetic field.

2. The method of claim 1 wherein the waveform has a decay rate which is slower than a cooling rate of the GMR sensor.

3. The method of claim 1 wherein the waveform has a stepped shape.

4. The method of claim 3 wherein the step shape has a first step value for heating the GMR sensor above a blocking temperature and a final orienting step value above a normal bias level.

5. The method of claim 1 wherein the voltage waveform has a peak amplitude, the peak amplitude being determined by sequentially increasing the amplitude of the voltage waveform until the GMR sensor evidences no readback error conditions.

6. A method for re-establishing a predetermined magnetic orientation of GMR sensors in a stack, comprising the steps of:

applying a first external magnetic field to the GMR sensors from a magnetic field source, the first external magnetic field having a first orientation relative to the GMR sensor;

during application of the first external magnetic field, biasing GMR sensors facing a first direction with a first electrical waveform, said first electrical waveform ending at a first time;

after the first time, reversing the polarity of the magnetic field to apply a second magnetic field having a second, opposite orientation relative to the GMR sensors;

during application of the second magnetic field, biasing the GMR sensors facing a second direction with a second electrical waveform, said second electrical waveform ending at a second time; and after the second time, removing the second external magnetic field.

7. The method of claim 6 wherein the first and second waveforms have a decay rate is slower than a cooling rate of the GMR sensor.

8. The method of claim 6 wherein the first and second waveform has a step shape having a first step value for heating the GMR sensor above a blocking temperature and a final orienting step value above a normal bias level.

9. The method of claim 6 wherein the step of biasing GMR sensors facing a first direction further comprises the steps of:

determining GMR sensors facing the first direction that evidence error conditions;

selecting only GMR sensors facing the first direction that evidence readback error conditions; and applying the first electrical waveform to the selected GMR sensors.

10. The method of claim 6 wherein the first electrical waveform has a peak amplitude, the peak amplitude being determined by sequentially increasing the amplitude of the first electrical waveform until the GMR sensor evidences no readback error conditions.

11. A method for establishing a predetermined magnetic orientation of a GMR sensor, comprising the step of applying an electrical voltage waveform across the GMR sensor in a first direction, said voltage waveform ending at a first time, the voltage waveform having a first amplitude for raising the GMR sensor above a blocking temperature and a second amplitude for setting the magnetic orientation of the GMR sensor.

12. The method of claim 11 wherein the waveform has a decaying shape.

13. The method of claim 12 wherein the waveform has a decay rate slower than a cooling rate of the GMR sensor.

14. The method of claim 11 wherein the waveform has a sloped ramped shape.

15. The method of claim 11 wherein the waveform has a stepped shape.

16. The method of claim 15 wherein the step shape has a first step value equal to the first amplitude for heating the GMR sensor above a blocking temperature and a final orienting step value equal to the second amplitude, the final orienting step value being above a normal bias level.

17. The method of claim 11 wherein the first amplitude of the voltage waveform is determined by sequentially increasing the first amplitude until the GMR sensor evidences no error conditions.

* * * * *